United States Patent
Patel (10) Patent No.: US 10,318,461 B2
(45) Date of Patent: Jun. 11, 2019

(54) SYSTEMS AND METHODS FOR INTERCONNECTING GPU ACCELERATED COMPUTE NODES OF AN INFORMATION HANDLING SYSTEM

(71) Applicant: Dell Products L.P., Round Rock, TX (US)

(72) Inventor: Bhavesh Govindbhai Patel, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 15/669,026

(22) Filed: Aug. 4, 2017

(65) Prior Publication Data
US 2019/0042512 A1 Feb. 7, 2019

(51) Int. Cl.
*G06F 13/40* (2006.01)
*G06F 13/42* (2006.01)

(52) U.S. Cl.
CPC ...... *G06F 13/4027* (2013.01); *G06F 13/4068* (2013.01); *G06F 13/4282* (2013.01)

(58) Field of Classification Search
CPC ......... G06F 13/4282; G06F 2213/0026; G06F 11/3006; G09G 5/363
See application file for complete search history.

(56) References Cited

U.S. PATENT DOCUMENTS

| | | | |
|---|---|---|---|
| 7,340,557 B2* | 3/2008 | Kong | G09G 5/363 710/306 |
| 7,616,206 B1* | 11/2009 | Danilak | G06F 15/16 345/505 |
| 9,645,902 B2* | 5/2017 | Breakstone | G06F 11/2012 |
| 2016/0072883 A1* | 3/2016 | Long | H04L 67/1095 709/219 |
| 2016/0292115 A1* | 10/2016 | Akhter | G06F 13/4027 |
| 2017/0161099 A1* | 6/2017 | Rashid | G06F 13/00 |
| 2017/0300253 A1* | 10/2017 | Parker | G06F 3/0619 |

(Continued)

OTHER PUBLICATIONS

NVIDIA—"White Paper—NVIDIA DGX-1 With Tesla V100 System Architecture", 44 pages, Dated Apr. 15, 2016 (Year: 2016).*

(Continued)

*Primary Examiner* — Brian T Misiura
(74) *Attorney, Agent, or Firm* — Jackson Walker L.L.P.

(57) ABSTRACT

An information handling system includes first and second compute nodes, each compute node including a central processing unit (CPU), a computational accelerator (CAC). An inter-accelerator transport (IAT) interface of each node connects to an IAT transport to provide an external interconnect, directly coupling first node GPUs with second node GPUs, for inter-node GPU-to-GPU (GtG) data traffic. Inter-node adapters on each node connect to an inter-node transport (INT) to provide an external interconnect coupling the GPUs of one node to the CPU/root of the other node for carrying inter-node non-GtG data traffic. Interconnects carrying non-GtG traffic, including the INT, may be ×16 PCIe 3.0 or later links while interconnects carrying GtG traffic, including the IAT interconnects, may be implemented as greater-than-PCIe (GTP) interconnects where GTP interconnects have a data transfer rate exceeding comparable PCIe data transfer rates, e.g., 16 GB/s per ×16 PCIE 3.0.

20 Claims, 3 Drawing Sheets

(56) References Cited

U.S. PATENT DOCUMENTS

| | | | |
|---|---|---|---|
| 2017/0357609 A1* | 12/2017 | Long | G06F 13/16 |
| 2018/0046514 A1* | 2/2018 | Breakstone | G06F 9/5016 |
| 2018/0101500 A1* | 4/2018 | Heyd | G06F 13/4022 |
| 2018/0150299 A1* | 5/2018 | Balle | G06F 21/57 |
| 2018/0188465 A1* | 7/2018 | Zer | G02B 6/4441 |

OTHER PUBLICATIONS

Dell—"Dell EMC Ready Solutions for AI"—13 pages, Dated 2018 (Year: 2018).*

"Introduction to InfiniBand for End Users"—54 pages, Dated 2010 (Year: 2010).*

NVIDIA—"NVIDIA DGX-1: The Fastest Deep Learning System" by Mark Harris, 12 pages, Dated Apr. 5, 2017 (Year: 2017).*

NVIDIA—"NVIDIA Tesla P100 GPU Accelerator", 2 pages, Dated Oct. 2016 (Year: 2016).*

NVIDIA—"NVIDIA Tesla P100: Infinite Compute Power for the Modern Data Center"—5 pages, Dated Oct. 2016 (Year: 2016).*

"NVLink, Pascal and Stacked Memory: Feeding the Appetite for Big Data"—by Dennis Foley, 3 pages, Dated Mar. 25, 2014 (Year: 2014).*

NVIDIA—"NVIDIA NVSWITCH—The World's Highest-Bandwidth On-Node Switch"—8 pages, Dated 2018 (Year: 2018).*

PLX—"Product Brief—PEX8796, PCI Express Gen3 Switch, 96 Lanes, 24 Ports"—5 pages, Dated Jul. 24, 2012 (Year: 2012).*

\* cited by examiner

SYSTEMS AND METHODS FOR INTERCONNECTING GPU ACCELERATED COMPUTE NODES OF AN INFORMATION HANDLING SYSTEM

TECHNICAL FIELD

The present disclosure relates to information handling systems and, more specifically, information handling systems for computationally intensive applications.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems are designed to handle computationally intensive workloads, including deep learning workloads. For purposes of this disclosure, deep learning refers to a subset of machine learning methods, architectures, systems, and applications. Machine learning encompasses a branch of data science that emphasizes methods for enabling information handling systems to construct analytic models that use algorithms that learn from data interactively. It is noted that, although disclosed subject matter may be illustrated and/or described in the context of a deep learning system, method, architecture, or application, such a system, method, architecture, or application is not limited to deep learning and may encompass one or more other computationally intensive solutions.

Some information handling systems, including information handling systems designed for computationally intensive applications, employ computational accelerators in conjunction with a central processing unit (CPU) to improve the computational performance of the applicable solution. In such information handling systems, a graphics processing unit (GPU) and, more typically, multiple GPUs may be used as computational accelerators. For purposes of this disclosure, a GPU is an integrated circuit device featuring a highly parallel architecture that employs large numbers of small but efficient cores to accelerate computationally intensive tasks.

Employing GPUs, or any other computational accelerators, in conjunction with one or more CPUs, requires interconnectivity among the GPUs and CPUs. Interconnecting two or more GPUs with one or more CPUs is generally challenging due to a number of factors. Under loading, GPUs tend to consume significantly more power and produce significantly more heat than CPUs, thus limiting the number of GPUs that may be included within a defined space or provided on a single circuit board. Using two or more distinct compute nodes, each having its own CPU and GPUs, may address heat and power issues, but external interconnects coupling distinct compute nodes generally employ peripheral component interconnect express (PCIe) interconnects. In such systems, the GPU-to-GPU data transfer rate between GPUs on different compute nodes may be undesirably limited by the data transfer rate of the inter-node PCIe interconnect. If, as an example, a multi-node GPU-based accelerator used in a particular deep learning solution employs PCIe interconnects for inter-node GPU-to-GPU data transfers, the overall performance of the GPU accelerator may be undesirably limited by the interconnect.

SUMMARY

In accordance with teachings of the present disclosure, problems associated with implementing a GPU-based computational accelerator distributed across two or more compute nodes are reduced or eliminated.

In accordance with embodiments of the present disclosure, an information handling system includes first and second compute nodes. For purposes of this disclosure, a compute node refers to a physically distinct information handling resource, which may be demarcated by a compute node enclosure such as a chassis encompassing the compute node or an information handling "drawer" containing a modular or blade embodiment of the compute node. Unless expressly indicated to the contrary, inter-node interconnects and transports, i.e., interconnects and transports between two compute nodes, require an external interconnect cable, ribbon, or other suitable form of media. In addition, all interconnects described herein are serial interconnects, although many of the described interconnects may employ multiple lanes of serial data signals.

Each compute node includes a CPU, a computational accelerator (CAC), a node switch, an inter-accelerator transport (IAT) interface configured to receive an IAT transport that provides an external interconnect directly coupling GPUs in the CAC of the first compute node with GPUs in the CAC of the second compute node, an inter-node adapter configured to receive an inter-node transport that provides an external interconnect for connecting the adapters of the two compute nodes, and various compute node interconnects. The IAT comprises an external data transfer medium for inter-node GPU-to-GPU traffic while the inter-node transport comprises an external data transfer medium for inter-node host-to-host traffic via PCIe or another suitable conventional interconnect.

In at least one embodiment, the IAT interface is configured to receive an IAT to connect the first CAC to the second CAC. The first inter-node adapter is configured to couple the CPU to an inter-node transport (INT). The INT is configured to connect the first inter-node adapter to an inter-node adapter of the second compute node.

The compute node interconnects include node switch interconnects and CAC interconnects. In at least one embodiment, the node switch interconnects include one or more interconnects coupling the node switch to the CPU/chipset, one or more interconnects coupling the node switch to the CAC, and one or more interconnects coupling the node switch and the first inter-node adapter. The CAC interconnects include one or more interconnects coupling the first CAC to the first IAT interface.

The first CAC may include a plurality of GPUs, all of which may be affixed to a printed circuit board or another monolithic substrate. Embodiments in which the first CAC includes a plurality of GPUs may be referred to herein as GPU embodiments.

The node switch interconnects coupling the node switch to the CAC may include a switch-to-GPU (StG) interconnect corresponding to each of the GPUs. The CAC interconnects coupling the CAC to the IAT interface may include a GPU-to-interface (GtI) interconnect corresponding to each of the GPUs. Some embodiments may include one or more additional GtI interconnects such that the CAC includes at least one GPU connected to the IAT interface by two or more GtI interconnects. The CAC interconnects may also include a GPU-to-GPU (GtG) interconnect corresponding to each unique pair of GPUs such that at least one GtG interconnect provides a direct connection between any two GPUs in the CAC. Some embodiments may include one or more additional GtG interconnects such that the CAC includes at least one pair of GPUs directly connected to each other by two or more GtG interconnects.

In at least one embodiment, the node switch interconnects comply with a first interconnect standard while the CAC interconnects and the IAT interconnects comply with a second interconnect standard that differs from the first interconnect standard. The maximum data rate of the CAC interconnects and the IAT interconnects complying with the second interconnect standard may exceed a maximum date rate of the node switch interconnects complying with the first interconnect standard. The first interconnect standard may be a PCIe standard, e.g., PCIe 3.0 or higher. Such embodiments may be referred to herein as PCIe embodiments and interconnects that comply with the second interconnect standard may be referred to as greater-than-PCIe (GTP) interconnects in reference to the higher data transfer rate of the second interconnect standard.

In PCIe embodiments, each of the node switch interconnects may include a PCIe link comprising a plurality of bidirectional lanes wherein each of the bidirectional lanes includes an upstream twisted pair for carrying an upstream PCIe differential signal and a downstream twisted pair for carrying a downstream PCIe differential signal. The number of lanes in each node switch interconnect may vary. For embodiments in which the first interconnect standard is PCIe 3.0 or higher, the number of lanes may be 16 or greater.

In at least some PCIe embodiments, each of the GTP interconnects, including the CAC interconnects and the IAT interconnects, may include a bidirectional GTP link that includes a downstream GTP sublink and an upstream GTP sublink. In at least one embodiment, the downstream GTP sublink includes eight or more downstream twisted pairs corresponding to eight or more downstream GTP differential signals. Similarly, the upstream GTP sublink may include eight or more upstream twisted pairs corresponding to eight or upstream GTP differential signals. For embodiments in which the first interconnect standard is PCIe 3.0, each of the upstream and downstream GTP differential signals may support $20 \times 2^{30}$ transactions per second, i.e., 2 Giga-transactions per second (GT/s) such that a GTP link configured with x8 sublinks, i.e., eight GTP differential signals/sublink, has a bidirectional data bandwidth of 40 GB/sec (GB/s) including 20 GB/s upstream and 20 GB/s downstream.

In some GPU embodiments, each of the GPUs may include a switch port and a plurality of ports referred to herein as GPU traffic ports or, more simply, G-ports. Each of the plurality of G-ports may be configured receive a GtG interconnect for carrying GtG traffic. The switch port may be configured to receive an StG interconnect coupling the GPU to the switch node for carrying non-GtG traffic. This non-GtG traffic may be referred to herein as PCIe traffic for compute node embodiments that employ PCIe as the first interconnect standard.

Each IAT interface may include a plurality of IAT connector blocks, with each IAT connector block receiving one of the GtI interconnects. In such embodiments, the IAT may include a corresponding plurality of IAT interconnects wherein each IAT connector block in the IAT interface connects a GtI interconnect from one of the GPUs to a corresponding IAT interconnect when the IAT is connected to the IAT interface, thereby providing an external interconnect, equivalent in performance to the CAC interconnects, between the applicable GPU and a GPU on the second compute node.

The inter-node adapter may include an adapter switch and an adapter interface. The adapter switch may be configured to receive an adapter local interconnect connected to the node switch. The adapter interface may be coupled to the adapter switch and may be configured to receive the INT. The adapter interface may be implemented with a compact external I/O connector including, in at least one embodiment, a mini serial attached SCSI (SAS) high density (HD) connector and the INT may comprise may a mini SAS HD cable.

In accordance with further embodiments of disclosed subject matter, a compute node assembly for use in an information handling system includes a CPU, a CAC comprising a plurality of GPUs, a node switch, an IAT interface, an inter-node adapter, and various compute node interconnects.

The first IAT interface may receive one end of an IAT that provides an external interconnect for carrying GtG traffic between GPUs in the first CAC and GPUs on a CAC of a another compute node. The inter-node adapter may be configured to couple an interconnect from the node switch to an INT that provides an external interconnect between the inter-node adapter and an inter-node adapter of another compute node for carrying non-GtG traffic between compute nodes. The INT may be implemented with an external mini SAS HD cable suitable to support a ×16 PCIe link between the two INTs.

The compute node interconnects may include node switch interconnects and CAC interconnects. The node switch interconnects may include: one or more root interconnects coupling the node switch to a node root encompassing the CPU and chipset; one or more interconnects coupling the node switch to the CAC, including StG interconnects in GPU embodiments; and one or more interconnects coupling the node switch to the inter-node adapter. In GPU embodiments, the CAC interconnects may include a plurality of GtG interconnects and a plurality of GtI interconnects. Each GtG interconnect may provide a point-to-point connection between two GPUs while each GtI interconnect may provide connection between a GPU and the IAT interface.

The node switch interconnects may comply with a PCIe standard while the CAC interconnects and the IAT interconnects may comply with a second, non-PCIe interconnect standard. In at least one embodiment, a maximum data transfer rate of the second interconnect standard exceeds a maximum date rate of the applicable PCIe standard. Such embodiments may be referred to as GTP embodiments.

In at least one embodiment, each of the GPUs includes a switch port and a plurality of G-ports. Each GPU switch port may be configured to receive an StG interconnect for carrying non-GtG traffic between the GPU and the node switch. Each of the G-ports may be configured to receive a CAC interconnect. The G-ports of each GPU may include one or more G-ports connected to GtG interconnects and one or more G-ports connected to GtI interconnects. Each GtG interconnect may carry local GtG traffic between G-ports of two GPUs. Each StG interconnect may carry non-GtG traffic between a GPU and the node switch.

The CAC interconnects may include at least one GtG interconnect connecting each unique pair of GPUs and at least one GtI interconnect connected to each of the GPUs. In at least one embodiment, the CAC interconnects also include at least one GPU pair connected by two or more GtG interconnects and at least one GPU with two or more G-ports connected to GtI interconnects.

In at least one embodiment, the first CAC includes four GPUs and each of the four GPUs includes six G-ports for a total of 24 G-ports. In such an embodiment, the CAC interconnects may include nine GtG interconnects, consuming 18 of the 24 G-ports, and six GtI interconnects consuming the reminder of the 24 G-ports. Other embodiments may employ more or fewer GPUs per CAC, more or fewer G-ports per GPU, more or fewer GtG interconnects, and more or fewer StG interconnects.

The IAT interface may include a plurality of external connector blocks and the IAT may include a corresponding plurality of IAT interconnects, each IAT implemented with a suitable external cable. Each end of the IAT interconnect external cable may be connected to a corresponding IAT connector block thereby connecting the IAT interfaces of two compute nodes for carrying inter-node GtG traffic. In the previously described embodiment with four GPUs and six GtI interconnects, each IAT interface may include six IAT connector blocks and the IAT may include six IAT interconnect external cables.

To support the high data rates desirable for interconnects carrying GtG traffic, including the IAT interconnects, the IAT may employ a quad small form-factor pluggable, double density (QSFP-DD) passive copper direct attach cables between the CACs of two different compute nodes.

Technical advantages of the present disclosure may be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
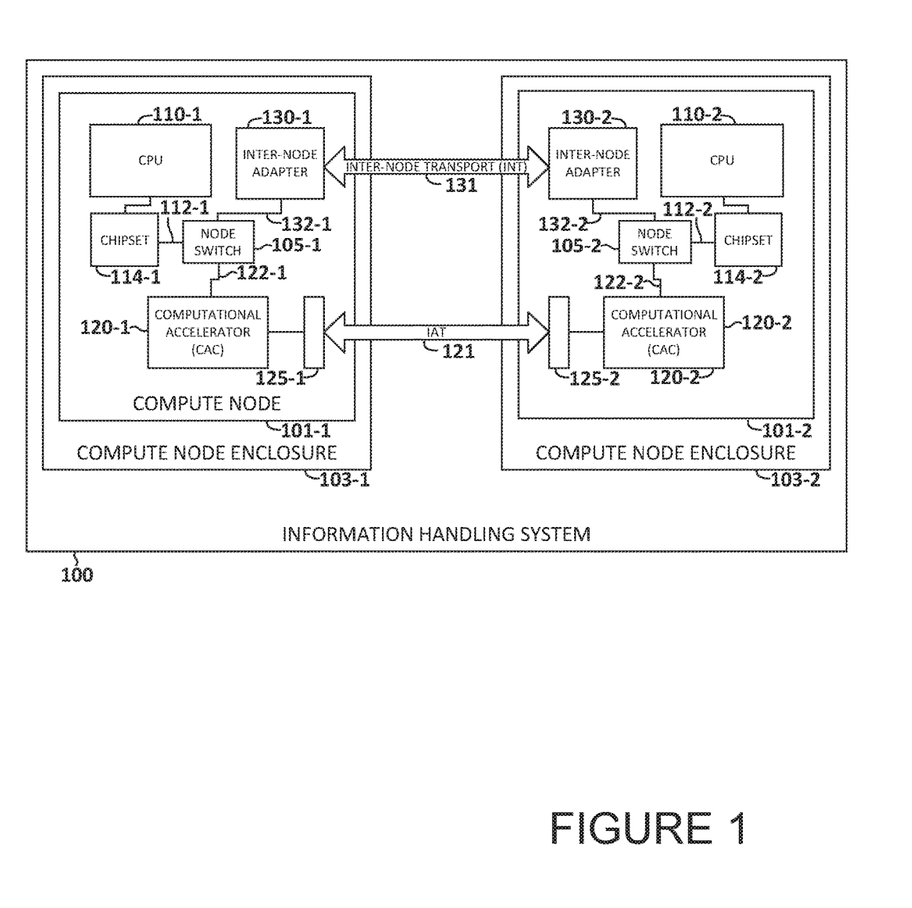
FIG. 1 illustrates a block diagram of an information handling system including two compute nodes, each compute node including a CAC, an IAT coupling the CACs, inter-node adapters on each compute node, and an INT coupling the two inter-node adapters.
Figure 2:
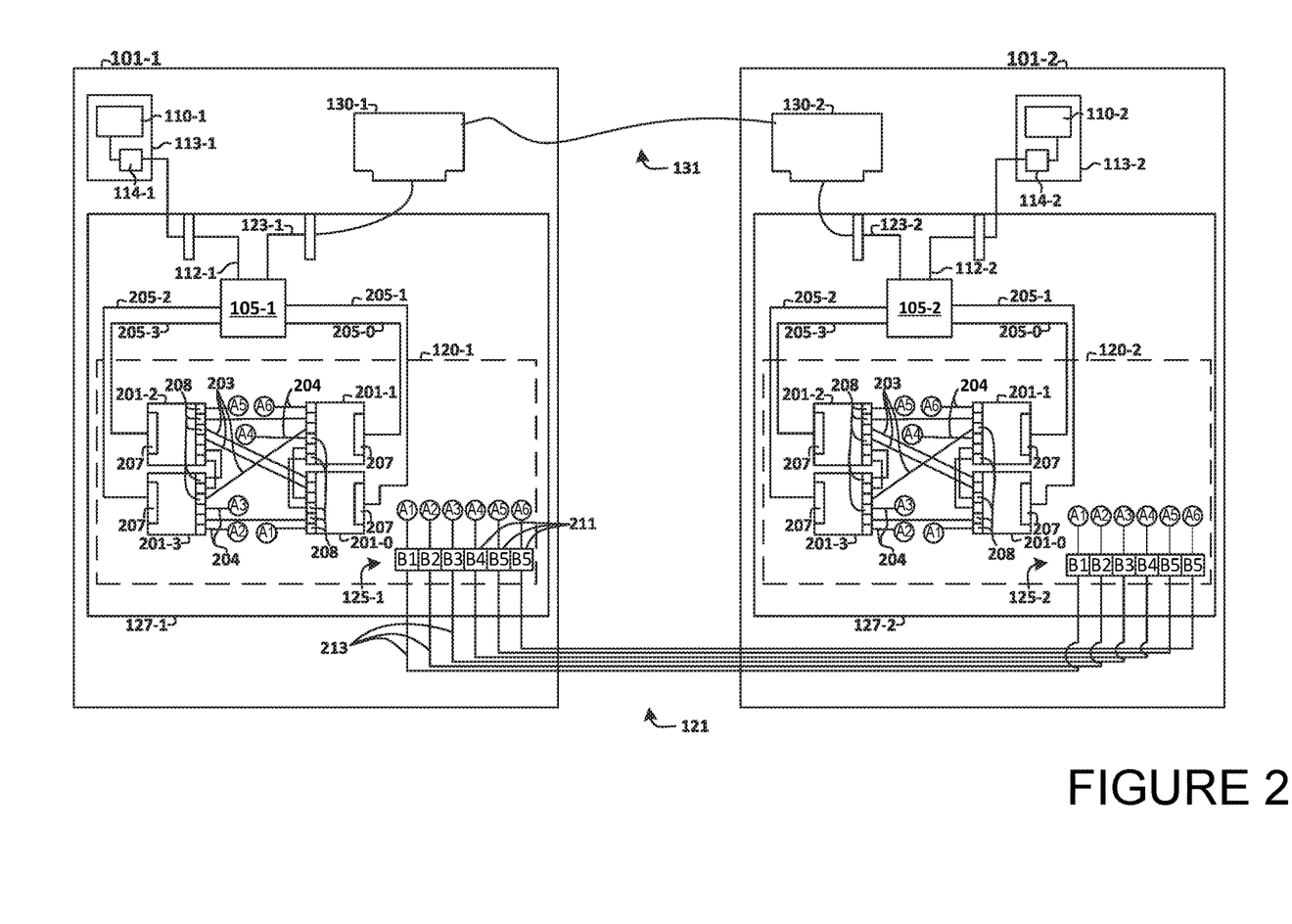
FIG. 2 is a block diagram illustrating detail of the CAC and the IAT of FIG. 1.
Figure 3:
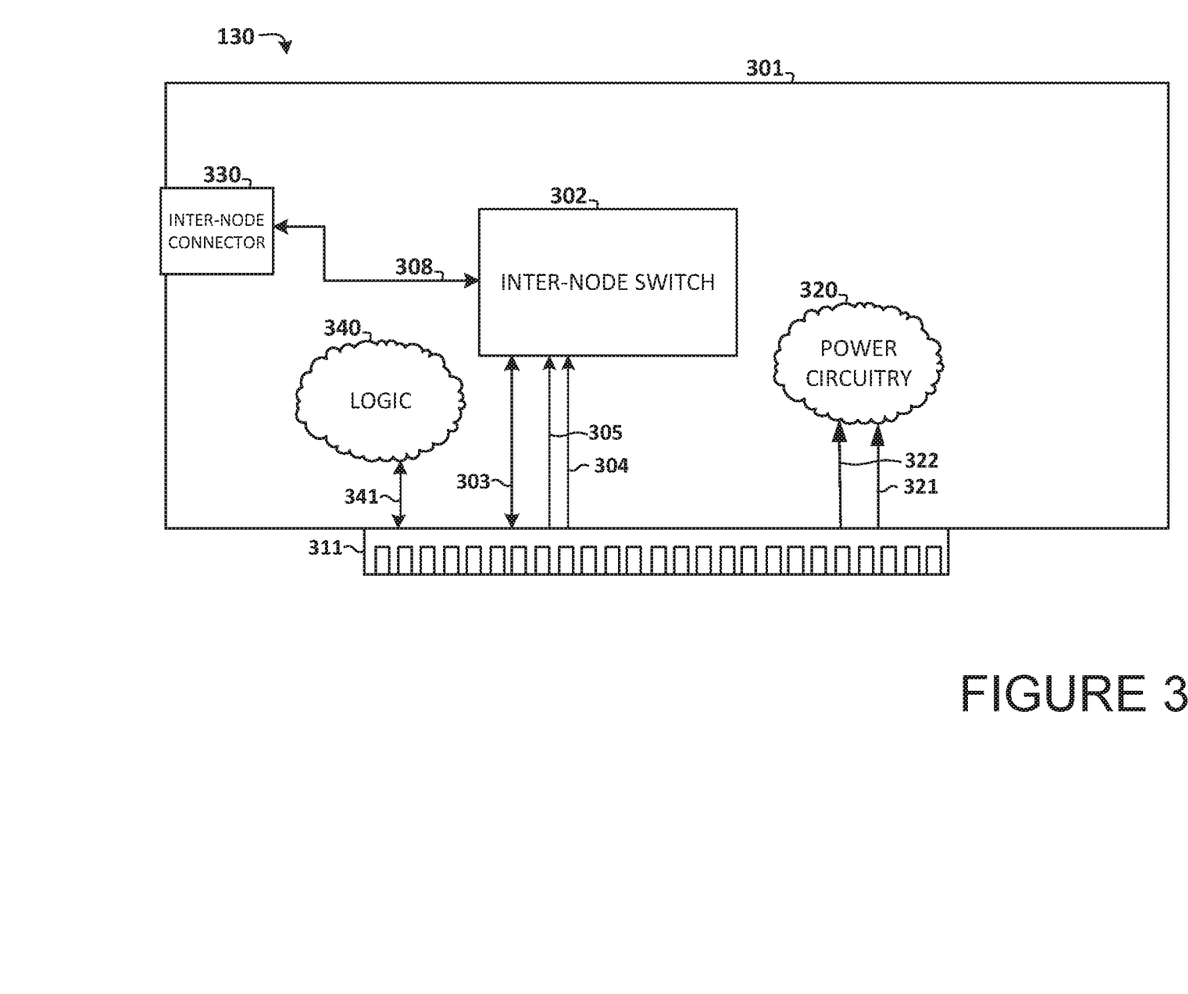
FIG. 3 is a block diagram illustrating detail of the inter-node adapter for use in the information handling system of FIG. 1.

Preferred embodiments and their advantages are best understood by reference to FIGS. 1-3, wherein like reference numerals are used to indicate like and corresponding elements. When multiple instances of an element are illustrated, hyphenated reference numerals may be used to indicate distinct instances of the element while unhyphenated forms of the reference numeral may refer to the element generically or collectively.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network data storage device, or any other suitable device and may vary in size, shape, performance, functionality, and price. The information handling system may include memory, one or more processing resources such as a CPU or hardware or software control logic. Additional components of the information handling system may include one or more data storage devices, one or more communications ports for communicating with external devices as well as various input and output (I/O) devices, such as a keyboard, a mouse, and a video display. The information handling system may also include one or more buses operable to transmit communication between the various hardware components.

In this disclosure, the term "information handling resource" may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

FIG. 1 illustrates an information handling system 100 suitable for computationally intensive workloads, including workloads associated with deep learning solutions, platforms, and applications. The information handling system 100 illustrated in FIG. 1 includes two compute nodes 101, each encompassed by a compute node enclosure 103 such as a chassis for a tower server or a rack mount server or a suitable enclosure for a modular or blade server. Each compute node 101 includes one or more CPUs 110, of which only one CPU 110 is illustrated for the sake of clarity, a chipset 114, a CAC 120, an inter-node adapter 130, and a node switch 105. System memory coupled to CPU 110 and storage devices coupled to CPU 110 either directly or via chipset 114 are not depicted in FIG. 1 for the sake of improved clarity.

The information handling system 100 illustrated in FIG. 1 further includes an IAT 121 that provides an external interconnect between IAT interfaces 125 on each compute node 101 for carrying inter-node GtG traffic between first CAC 120-1 and second CAC 120-2. Information handling system 100 further includes an INT 131 providing an external interconnect coupling first inter-node adapter 130-1 to second inter-node adapter 130-2 for carrying inter-node non-GtG traffic. Although FIG. 1 illustrates information handling system 100 with two compute nodes 101, the number of compute nodes 101 may be greater than two with appropriate modifications. In at least one embodiment, INT 131 implements a ×16 PCIe 3.0 (or higher) link capable of achieving a data transfer rate of slightly less than 16 GB/s while IAT 121 implements one or more external GTP interconnects, each capable of data transfer rates of 20 GB/s in each direction.

CPU 110 may be implemented with any of various suitable general purpose microprocessor architectures including x86 family microprocessors. Chipset 114 supports various interfaces enabling peripheral devices, including I/O devices, to communicate with CPU 110. Although FIG. 1 illustrates each chipset 114 as a single discrete device, functionality provided by the illustrated chipset 114 may be integrated within CPU 110. Conversely, functionality provided by the chipset 114 illustrated in FIG. 1 may be implemented in two or more integrated circuits.

Each compute node 101 illustrated in FIG. 1 includes node switch interconnects coupling node switch 105 to other elements of compute node 101 including CAC 120, inter-node adapter 130, and CPU 110 via chipset 114. The node switch interconnects illustrated in FIG. 1 include a switch-to-adapter interconnect 123 coupling node switch 105 to inter-node adapter 130, a switch-to-CAC interconnect 122 coupling node switch 105 to CAC 120, and a switch-to-root interconnect 112 coupling node switch 105 to a node root encompassing CPU 110 and chipset 114. In PCIe embodiments, the node switch interconnects may be implemented as PCIe-compliant interconnects and, more specifically, interconnects compliant with PCIe version 3.0 or later. In such embodiments, node switch 105 may be implemented with any of various suitable commercially distributed PCIe switch devices including PCIe switch devices featuring a plurality of ports, each of which may be configured in any of two or more PCIe lane-width configurations. A PEX8796 model PCIe 3.0 switch from Broadcom/PLX Technology, which supports 96 total PCIe 3.0 lanes and 24 configurable ports, each of which may be configured as a x4, x8, or x16 PCIe 3.0 link is a non-limiting example of a device suitable for use as node switch 105.

Each compute node 101 may include, in addition to its node switch interconnects, CAC interconnects including IAT interconnects employed in IAT 121 connected between IAT interfaces 125 for coupling first CAC 120-1 and second CAC 120-2 via as well as internal CAC interconnects, not explicitly depicted in FIG. 1, coupling computational elements or components within each CAC 120.

In at least one embodiment, described in greater detail with respect to FIG. 2, the CAC interconnects, as well as the IAT interconnects are GTP interconnects, i.e., non-PCIe interconnects having higher data transfer capacities than x16 PCIe 3.0 interconnects. In one such GTP embodiment, the CAC interconnects include a pair of CAC sublinks, referred to herein as upstream and downstream CAC sublinks, wherein each CAC sublink includes eight or more differential signals, each differential signal conveyed via a twisted pair of copper wires, referred to herein as simply as a twisted pair.

FIG. 2 illustrates an information handling system 100 in which each CAC 120 includes a plurality of computational accelerators and various intra-accelerator interconnects, some of which constitute node switch interconnects and some of which constitute CAC interconnects. Each CAC 120 illustrated in FIG. 2 includes a group of four GPUs 201, each of which may be attached to a single substrate such as a single printed circuit board 127. A non-limiting example of a GPU suitable for use as GPU 201 is a Tesla™ P100 GPU from Nvidia Corporation. Other embodiments of CAC 120 may include a different type of computational accelerator and/or a different number of computational accelerators.

As illustrated in FIG. 2, each GPU 201 includes multiple ports including a switch port 207 and a plurality of G-ports 208. The CAC 120 illustrated in FIG. 2 includes StG interconnects 205 connecting the switch port 207 of each GPU 201 to node switch 105. The plurality of StG interconnects 205 collectively equate to the switch-to-CAC interconnect 122 illustrated in FIG. 1. In PCIe embodiments, each StG interconnect 205 may be implemented as a x16 (or greater) PCIe 3.0 link.

As indicated in the preceding description, each CAC 120 may include CAC interconnects. The CAC interconnects illustrated in FIG. 2 include GtG interconnects 203 and GtI interconnects 204. Each GtG interconnect 203 is connected between a G-port 208 of one GPU 201 within first CAC 120-1 and a G-port 208 of another GPU 201 within first CAC 120-1. In at least one embodiment, each GPU 201 is directly connected to each of the other GPUs 201 within the same CAC 120 via one or more GtG interconnects 203. A CAC 120 with four GPUs, such as the first CAC 120-1 illustrated in FIG. 2, has six unique GPU pairs (GPUs 0&1, 0&2, 0&3, 1&2, 1&3, and 2&3). Accordingly, the GtG interconnects 203 for first CAC 120-1 include at least six GtG interconnects 203 corresponding to the six unique pairs of GPUs 201. The first CAC 120-1 of FIG. 2 further illustrates that one or more of the GPU pairs may be connected by more than one GtG interconnect 203. The first CAC 120-1 illustrated in FIG. 2 includes three GPU pairs connected by two GtG interconnects 203, (GPU pairs 0/1, 0/2, and 2/3). Other embodiments may include more or fewer GtG interconnects 203 and more or fewer GPU pairs that are connected by two or more GtG interconnects 203.

Each GtI interconnect 204 in first CAC 120-1 connects a GPU 201 to first IAT interface 125-1. More specifically, each GtI interconnect 204 connects a G-port 208 of one of the GPUs 201 to a connector block 211 of IAT interface 125. Each GPU 201 in the first CAC 120-1 illustrated in FIG. 2 includes at least one GtI interconnect 204 connecting each GPU 201 to first IAT interface 125-1. Thus, each GPU 201 illustrated in first CAC 120-1 is connected to each of the other GPUs 201 of first CAC 120-1, via GtG interconnects 203, and to at least one of the GPUs 201 in second CAC 120-2 of compute node 101-2 via GtI interconnects 204, IAT interfaces 125, and the IAT interconnects 213 of IAT 121.

As discussed above, each node switch 105 is connected to each of the GPUs 201 in the applicable CAC 120 via StG interconnects 205. The illustrated node switch 105 is also connected to inter-node adapter 130 via switch-to-adapter interconnect 123 and to a node root 113, encompassing chipset 114 and CPU 110, via switch-to-root interconnect 112. The node switch 105 may be implemented as a PCIe switch for providing and supporting multiple, configurable PCIe ports. In one embodiment, node switch 105 may be implemented with a configurable, multi-port PCIe 3.0 (or higher) switch. A model PEX8796 PCIe 3.0 switch from Broadcom/PLX Technologies, which includes 24 configurable ports and 96 PCIe lanes, is a non-limiting example of a PCIe switch suitable for use as node switch 105. Embodiments employing such a node switch may be configured to support as many as six x16 PCIe links. Accordingly, each of the six interconnects connected to node switch 105, including four StG interconnects 205, the switch-to-adapter interconnect 123, and switch-to-root interconnect 112, may comprise x16 PCIe links.

Each of the GPUs 201 illustrated in FIG. 2 includes six G-ports 208 and the depicted implementation of first CAC 120-1 includes a total of nine GtG interconnects 203 and six GtI interconnects 204. The nine GtG interconnects 203 include: two GtG interconnects 203 between GPU 201-0 and GPU 201-1, two GtG interconnects 203 between GPU 201-0 and GPU 201-2, one GtG interconnect 203 between GPU 201-0 and 201-3, one GtG interconnect 203 between GPU 201-1 and GPU 201-2, one GtG interconnect 203 between GPU 201-1 and GPU 201-3, and two GtG interconnects 203 between GPU 201-2 and GPU 201-3. Other embodiments may include more, fewer, and/or differently configured GtG interconnects 203 than those illustrated in FIG. 2.

Each GPU 201 of first CAC 120-1 is connected to one or more of the GPUs 201 of second CAC 120-2 via GtI interconnects 204, first and second IAT interfaces 125-1 and 125-2, and IAT 121. Each GtI interconnect 204 connects a G-port 208 of one of the GPUs 201 to a connector block 211 of IAT interface 125. In the first CAC 120-1 illustrated in FIG. 2, the nine GtG interconnects 203 consume 18 of the 24 available GPU ports, leaving six GPU ports available for GtI interconnects 204. As depicted in FIG. 2, the six GtI interconnects 204 include one GtI interconnect 204 from GPU 201-0, two GtI interconnects 204 from GPU 201-1, one GtI interconnect 204 from GPU 201-2, and two GtI interconnects 204 from GPU 201-3.

Each connector block 211 of IAT interface 125 may be suitable to receive an IAT interconnect 213 of IAT 121 when IAT 121 is connected between IAT interfaces 125 on each compute node 101. Each connector block 211 may comprise a QSFP-DD connector and each IAT interconnect 213 may comprise a QSFP-DD direct attach cable of copper. Other embodiments may employ single mode or multimode optical fiber as IAT interconnects 213.

Each of the interconnects carrying GtG traffic, whether intra-node or inter-node, including GtG interconnects 203, GtI interconnects 204, and IAT interconnects 213, may be implemented as a GTP interconnect capable of achieving data transfer rates exceeding the approximate 16 GB/s data transfer rate of ×16 PCIe 3.0 links. In at least one embodiment, a GTP interconnect may include a pair of GTP sublinks (upstream and downstream) wherein each GTP sublink includes eight or more GTP differential signals corresponding to eight or more GTP twisted pairs configured to operate at 20 GT/s. NVLink™ from Nvidia Corporation is an example of an interconnect technology suitable for use as a GTP interconnect within information handling system 100.

FIG. 3 illustrates a block diagram of inter-node adapter 130. The illustrated inter-node adapter 130 includes a printed circuit board 301, a switch, referred to herein as inter-node switch 302, power circuitry 320, and an inter-node connector 330.

The form factor of inter-node adapter 130 is an implementation decision that may vary. In at least one embodiment, the printed circuit board 301 of inter-node adapter 130 is implemented as a half-height, half-length PCIe card. In such embodiments, inter-node adapter 130 may be connected to a half height, half-length PCIe slot (not explicitly depicted) of the applicable compute node 101. The PCIe slot may be provided by a riser card (not depicted) connected to a system board or mother board (not depicted) of compute node 101.

FIG. 3 illustrates inter-node switch 302 configured to receive a PCIe link 303, a reference clock signal 304, and a reset signal 305. FIG. 3 further illustrates inter-node adapter 130 configured to receive first power signal 321 and second power signal 322, which are routed to power circuitry 320 as shown. In at least one PCIe embodiment, first power signal 321 is a 12 V signal and second power signal 322 is a 3.3 V power signal. The logic 340 illustrated in FIG. 3 may represent "glue logic" for controlling adapter configuration settings, supporting management operations for the adapter, and the like. In at least one embodiment, logic 340 may be accessed via a lightweight communication bus 341, which be implemented as an inter-integrated circuit (I2C) bus, a system management (SM) bus, or another suitable lightweight communication interconnect. In some embodiments, at least some of the signals illustrated in FIG. 3 may be cabled to a cable connector of a riser card in which inter-node adapter 130 is inserted. In such embodiments, the signals cabled to the riser card may include the PCIe link 303, first power signal 321, second power signal 322, and the signals for lightweight communication bus 341.

The inter-node switch 302 provides a PCIe interconnect 308 to the inter-node connector 330. Inter-node connector 330 is configured to connect to one end of the INT 131 (FIG. 1) to couple first inter-node adapter 130-1 to second inter-node adapter 130-2 for conveying inter-node non-GtG traffic including traffic between a GPU 201 of first compute node 101-1 and the CPU 110-2 of second compute node 101-2 or vice versa. In at least one embodiment, the inter-node connector 330 is implemented as a mini SAS HD connector and the INT 131 is a mini SAS HD cable.

Although the present disclosure has been described in detail, it should be understood that various changes, substitutions, and alterations can be made hereto without departing from the spirit and the scope of the disclosure as defined by the appended claims.

What is claimed is:

1. An information handling system, comprising:
 a first compute node, wherein the first compute node includes:
 a central processing unit (CPU);
 a first computational accelerator (CAC) comprising a plurality of graphics processing units (GPUs);
 a node switch;
 a first inter-accelerator transport (TAT) interface configured to receive an IAT comprising one or more IAT interconnects, wherein each IAT interconnect is configured to carry inter-node GPU-to-GPU (GtG) traffic, comprising data traffic between a GPU in the first CAC and a GPU in a second CAC, wherein the second CAC comprises a CAC of a second compute node; and
 compute node interconnects, wherein the compute node interconnects include:
 node switch interconnects, wherein the node switch interconnects include:
 an interconnect coupling the CPU and the node switch; and
 one or more switch-to-GPU (StG) interconnects coupling the node switch and one or more of the plurality of GPUs; and
 a plurality of CAC interconnects, including:
 one or more (GtI) interconnects, wherein each of the one or more GtI interconnects connects a GPU in the first CAC to the IAT interface; and
 a plurality of GtG interconnects wherein each GtG interconnect connects two of the GPUs in the first CAC;
 wherein each of the node switch interconnects is implemented in accordance with a peripheral components interconnect express (PCIe) interconnect technology; and
 wherein each of the one or more IAT interconnects, each of the one or more GtI interconnects, and each of the plurality of GtG interconnects are implemented in accordance with a second interconnect technology wherein the second interconnect technology comprises a greater-than-PCIe (GTP) interconnect technology having an achievable data rate exceeding an achievable data rate of a PCIe interconnect technology.

2. The information handling system of claim 1, further comprising:

a first inter-node adapter configured to couple the first compute node to an inter-node transport (INT), wherein:
the INT is configured to connect the first inter-node adapter to a second inter-node adapter;
the second inter-node adapter comprises an inter-node adapter of the second compute node; and
the IAT is configured to carry inter-node non-GtG traffic.

3. The information handling system of claim 2, wherein the node switch interconnects include an interconnect coupling the node switch and the first inter-node adapter.

4. The information handling system of claim 2, wherein the second interconnect technology includes an upstream sublink, comprising a first plurality of eight or more differential signals, and a downstream sublink, comprising a second plurality of eight or more differential signals.

5. The information handling system of claim 4, each of the first plurality of eight or more differential signals corresponds to a twisted copper pair.

6. The information handling system of claim 4, one or more StG interconnects include an StG interconnect corresponding to each of the plurality of GPUs.

7. The information handling system of claim 4, wherein:
each of the node switch interconnects includes a PCIe link comprising at least 16 bidirectional lanes.

8. The information handling system of claim 4, wherein the first and second compute nodes are housed in separate chassis and wherein the IAT interface and the INT comprise external interconnects.

9. The information handling system of claim 4, wherein each of the eight or more differential signals supports 20 giga-transactions per second.

10. The information handling system of claim 4, wherein each of the GPUs includes:
a switch port configured to receive one of the StG interconnects; and
a plurality of G-ports, each configured to receive a GtG interconnect.

11. The information handling system of claim 4, wherein:
at least two GtG interconnects connect a pair of the GPUs wherein the pair of the GPUs includes a first GPU and a second GPU; and
at least two GtI interconnects are connected to at least one of the GPUs.

12. The information handling system of claim 4, wherein:
the first IAT interface includes a plurality of connector blocks; and
the IAT includes a plurality of IAT interconnects, including an IAT interconnect corresponding to each of the plurality of connector blocks.

13. The information handling system of claim 12, wherein the first inter-node adapter includes an inter-node switch configured to receive an adapter local interconnect connected to the node switch.

14. The information handling system of claim 12, wherein the plurality of connector blocks includes a plurality of quad small form-factor plugabble double density (QSFP-DD) connectors, each configured to connect one of the GtI interconnects to one of the IAT interconnects.

15. A compute node assembly for use in an information handling system, wherein the compute node assembly comprises:
a central processing unit (CPU);
a first computational accelerator (CAC) comprising a plurality of graphics processing units (GPUs);
a node switch;
a first inter-accelerator transport (TAT) interface configured to receive an IAT comprising one or more IAT interconnects, wherein each IAT interconnect is configured to carry traffic between a GPU in the first CAC and a GPU in a second CAC, wherein the second CAC comprises a CAC of a second compute node; and
compute node interconnects, wherein the compute node interconnects include:
node switch interconnects, wherein the node switch interconnects include:
an interconnect coupling the CPU and the node switch; and
one or more switch-to-GPU (StG) interconnects coupling the node switch and one or more of the plurality of GPUs; and
a plurality of CAC interconnects, including:
one or more (GtI) interconnects, wherein each of the one or more GtI interconnects connects a GPU in the first CAC to the IAT interface; and
a plurality of GPU-to-GPU (GtG) interconnects wherein each GtG interconnect connects two of the GPUs in the first CAC;
wherein each of the node switch interconnects is implemented in accordance with a first interconnect technology; and
wherein each of the one or more IAT interconnects, each of the one or more GtI interconnects, and each of the plurality of GtG interconnects are implemented in accordance with a second interconnect technology wherein the second interconnect technology has an achievable data rate exceeding an achievable data rate of the first interconnect technology.

16. The compute node assembly of claim 15, wherein the first interconnect technology comprises a peripheral component interconnect express (PCIe) standard and the CAC interconnects comply with a second interconnect standard that differs from the PCIe standard, wherein a maximum data rate of the second interconnect standard exceeds a maximum date rate of the PCIe standard.

17. The compute node assembly of claim 15, wherein each of the GPUs includes:
a switch port configured to receive a node switch interconnect; and
a plurality of G-ports, each configured to receive a CAC interconnect, wherein the plurality of G-ports include:
one or more G-ports connected to an GtI interconnect; and
one or more G-ports connected to a GtG interconnect.

18. The compute node assembly of claim 17, wherein the CAC interconnects include:
at least one GtG interconnect for each unique pair of the GPUs; and
at least one GtI interconnect for each of the GPUs.

19. The compute node assembly of claim 18, wherein:
the first CAC includes four GPUs;
each of the four GPUs includes six G-ports; and
the CAC interconnects include:
six GtI interconnects; and
nine GtG interconnects.

20. The compute node assembly of claim 19, wherein the first IAT interface includes six external connector blocks, the inter-accelerator transport includes six external cables wherein each external cable of the inter-accelerator transport is connected to one of the connector blocks.

* * * * *

UNITED STATES PATENT AND TRADEMARK OFFICE
CERTIFICATE OF CORRECTION

PATENT NO. : 10,318,461 B2
APPLICATION NO. : 15/669026
DATED : June 11, 2019
INVENTOR(S) : Patel It is certified that error appears in the above-identified patent and that said Letters Patent is hereby corrected as shown below:

In the Claims

Please amend Claim 1 as follows:
1. An information handling system, comprising:
  a first compute node, wherein the first compute node includes:
  a central processing unit (CPU);
  a first computational accelerator (CAC) comprising a plurality of graphics processing units (GPUs);
  a node switch;
  a first inter-accelerator transport (IAT) interface configured to receive an IAT comprising one or more IAT interconnects, wherein each IAT interconnect is configured to carry inter-node GPU-to-GPU (GtG) traffic, comprising data traffic between a GPU in the first CAC and a GPU in a second CAC, wherein the second CAC comprises a CAC of a second compute node; and
  compute node interconnects, wherein the compute node interconnects include:
  node switch interconnects, wherein the node switch interconnects include:
  an interconnect coupling the CPU and the node switch; and
  one or more switch-to-GPU (StG) interconnects coupling the node switch and one or more of the plurality of GPUs; and
  a plurality of CAC interconnects, including:
  one or more (GtI) interconnects, wherein each of the one or more GtI interconnects connects a GPU in the first CAC to the IAT interface; and
  a plurality of GtG interconnects wherein each GtG interconnect connects two of the GPUs in the first CAC;
  wherein each of the node switch interconnects is implemented in accordance with a peripheral components interconnect express (PCIe) interconnect technology; and
  wherein each of the one or more IAT interconnects, each of the one or more GtI interconnects, and each of the plurality of GtG interconnects are implemented in accordance with a second interconnect technology wherein the second interconnect technology comprises a greater-than-PCIe (GTP) interconnect technology having an achievable data rate exceeding an achievable data rate of a PCIe interconnect technology.

Signed and Sealed this
Fourth Day of February, 2020

Andrei Iancu
*Director of the United States Patent and Trademark Office*

CERTIFICATE OF CORRECTION (continued)
U.S. Pat. No. 10,318,461 B2

Please amend Claim 6 as follows:
6. The information handling system of Claim 4, wherein one or more StG interconnects include an StG interconnect corresponding to each of the plurality of GPUs.

Please amend Claim 15 as follows:
15. A compute node assembly for use in an information handling system, wherein the compute node assembly comprises:
    a central processing unit (CPU);
    a first computational accelerator (CAC) comprising a plurality of graphics processing units (GPUs);
    a node switch;
    a first inter-accelerator transport (IAT) interface configured to receive an IAT comprising one or more IAT interconnects, wherein each IAT interconnect is configured to carry traffic between a GPU in the first CAC and a GPU in a second CAC, wherein the second CAC comprises a CAC of a second compute node; and
    compute node interconnects, wherein the compute node interconnects include:
    node switch interconnects, wherein the node switch interconnects include:
    an interconnect coupling the CPU and the node switch; and
    one or more switch-to-GPU (StG) interconnects coupling the node switch and one or more of the plurality of GPUs; and
    a plurality of CAC interconnects, including:
    one or more (GtI) interconnects, wherein each of the one or more GtI interconnects connects a GPU in the first CAC to the IAT interface; and
    a plurality of GPU-to-GPU (GtG) interconnects wherein each GtG interconnect connects two of the GPUs in the first CAC;
    wherein each of the node switch interconnects is implemented in accordance with a first interconnect technology; and
    wherein each of the one or more IAT interconnects, each of the one or more GtI interconnects, and each of the plurality of GtG interconnects are implemented in accordance with a second interconnect technology wherein the second interconnect technology has an achievable data rate exceeding an achievable data rate of the first interconnect technology.